United States Patent Office 2,849,415
Patented Aug. 26, 1958

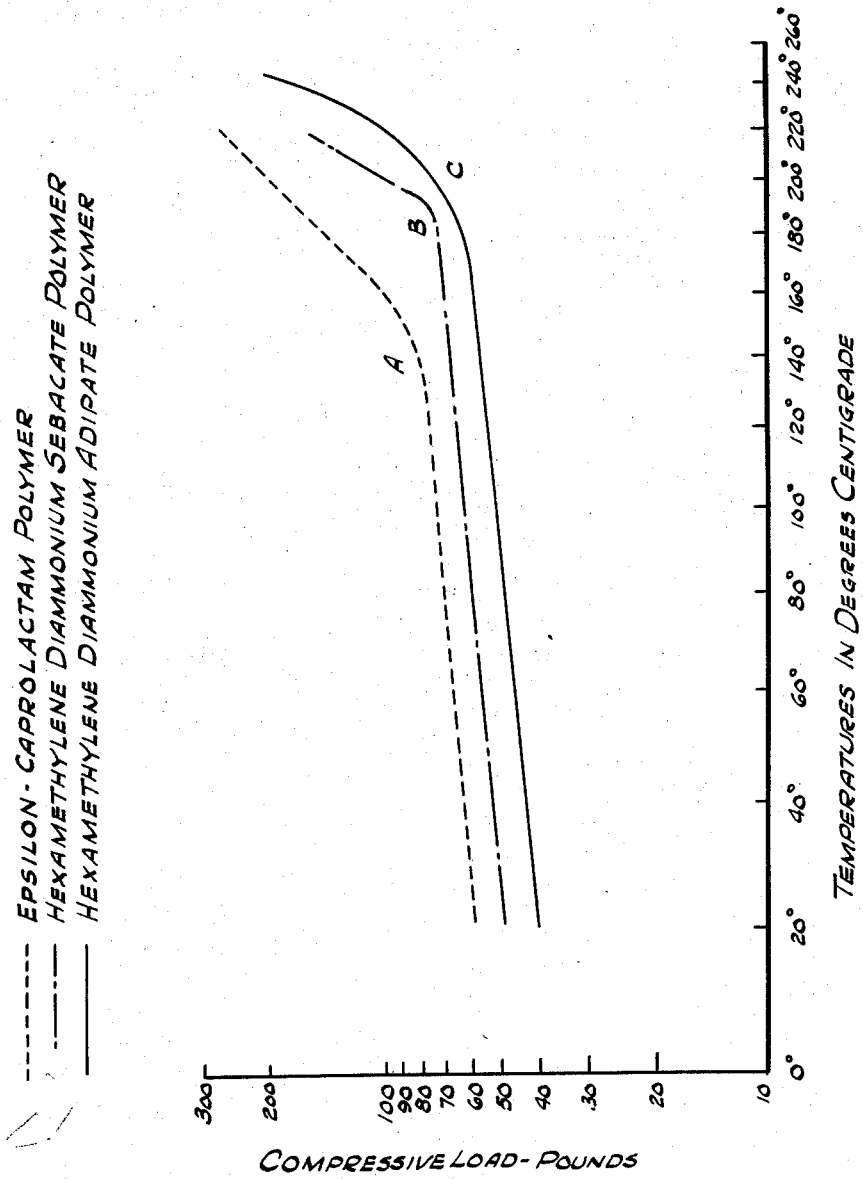

2,849,415

NYLON COMPOSITION AND ARTICLE

Louis L. Stott, Wyomissing, Pa., assignor to The Polymer Corporation, a corporation of Pennsylvania Application September 21, 1954, Serial No. 457,449

6 Claims. (Cl. 260—37)

This invention relates to the art of molding high molecular weight synthetic linear polyamides and is a continuation-in-part of applications Serial No. 227,283, filed May 19, 1951, in the name of Louis L. Stott, and now abandoned and Serial No. 272,966, filed February 23, 1952, now Patent 2,695,425, issued November 30, 1954, in the name of Louis L. Stott. The synthetic polymeric materials used in the practice of this invention are the synthetic linear polyamides of the general type described in United States Patents 2,071,250, 2,071,254 and 2,130,948. The polymers there described are high molecular weight products which generally can be obtained crystalline in structure as evidenced by X-ray powder diffraction patterns of the polymers in the massive state.

The polyamides of the present type, generally speaking, comprise the reaction product of a linear polymer-forming composition, for example, one consisting essentially of bifunctional reacting material, which comprises in substantial amount molecules containing two amide-forming groups each of which is complementary to an amide-forming group in other molecules in said composition.

These polyamides as described above, or as otherwise identified hereinafter, can be obtained, for example, by self-polymerization of monoamino-monocarboxylic acid, or by reacting a diamine with a dibasic carboxylic acid in substantially equimolecular amounts, it being understood that reference herein to the amino acids, diamines, and dibasic carboxylic acids, is intended to include the equivalent amide-forming derivatives of these reactants.

These linear polyamides include also polymers obtained by admixture of other linear polymer-forming reactants, as for instance glycol-dibasic acid mixtures in the case of polyester-amides, with the mentioned polyamide-forming reactants. The best results in the practice of the invention described herein, however, are obtained with unmodified straight polyamides. In the interpolymers, as well as in the simple polyamides, the average number of carbon atoms separating the amide groups is at least two. On hydrolysis with hydrochloric acid, the amino acid polymers yield the amino acid hydrochloride, and the diamine-dibasic acid polymers yield the diamine hydrochloride and the dibasic carboxylic acid. In any case, the polyamides are limited to those which are soluble in phenol at room temperature and are insoluble in ethylene glycol except at temperatures above about 140° C. For the sake of simplicity the linear polyamides described above will be referred to herein as nylon.

Although these materials were originally introduced as fibers for use in the textile industry, they have subsequently been made available as raw materials for the molding and extrusion industries. The high melting nylons, such as polyhexamethylene adipamide, and polyhexamethylene sebacamide, are characterized by relatively sharp melting points and high fluidity in the molten condition in comparison to other thermoplastic materials, such as cellulose acetate and polystyrene. These characteristics have made compression molding of these nylons difficult. At the present time shaped nylon pieces are prepared commercially, either by machining solid nylon, such as nylon rod, or by melting nylon and forming it by injection molding. Both of these methods have certain drawbacks. Bearings machined from nylon rod, for instance, are relatively expensive to make and involve much waste. Furthermore, the manufacturing techniques for producing nylon rod, particularly for the larger sizes, usually introduce severe strains which must be removed by conditioning. The injection molding technique requires complicated and expensive apparatus, high cost molds, and also frequently results in a product having many strains. These strains cause bearings prepared by injection molding to seize readily if large clearances are not provided. The presently used molding techniques depend upon heating a polyamide above its melting point and exerting pressure on the molten material. The strains produced in the resultant article come as a consequence of cooling the molten material and, at least in part, are due to a relatively high volumetric shrinkage on solidification.

In accordance with my United States application Serial No. 227,283, filed May 19, 1951, molded nylon articles containing fillers are described. These articles are made by compressing nylon powder having an ultimate particle size of less than 40 microns and a finely divided filler with sufficient pressure so that they may be handled. The compressed article is thereafter sintered by heating to a temperature just below the melting point of the nylon. Such fillers are capable of imparting special desirable characteristics to nylon molded articles. Among such general characteristics are increased dimensional stability, decreased sensitivity to humidity and increased strength. In addition, a specific filler, molybdenum disulfide, is capable of imparting self-lubricating properties to the finished article.

It is technically extremely difficult to get a uniform dispersion of fillers in molten nylon, particularly where the filler is desired in high concentrations. For example, such attempts to incorporate 15 to 20 percent molybdenum disulfide with nylon by the conventional method of mixing the molybdenum disulfide with molding powder is unsatisfactory. When molybdenum disulfide and the molding powder are thus mixed and the mixture is heated, poor distribution and a tendency for the filler to settle result. If the filler is added to molten nylon, segregation of the filler occurs due to difference in specific gravity. Thus it is almost impossible to obtain a uniform dispersion of a relatively dense material such as molybdenum disulfide at more than low concentrations by presently known techniques when the composition is taken above the melting point of nylon in order to injection mold or extrude the mixture by conventional means.

It is an object of this invention to produce molded articles of modified nylon, i. e. nylon having a filler which imparts unusual lubricating qualities to nylon articles. Another object is to prepare molded nylon articles having greater dimensional stability during humidity changes than unmodified nylon articles. Still another object is to produce powders and nylon articles having molybdenum disulfide evenly distributed throughout the powders and articles even though there is a large density differential between the filler and nylon. These and other objects which will become apparent hereafter may be accomplished as follows:

Powder having an ultimate particle size of less than 40 microns is mixed thoroughly with molybedenum disulfide and compressed to the desired shape with sufficient pressure so that the shaped green article may be handled. The compressed article is thereafter heated to a temperature sufficient to sinter the particles of nylon together without inducing any substantial molten phase. The article may be annealed to remove any residual strains.

It is essential that a substantial portion of the nylon particles be below about 40 microns in diameter and preferably below 25 microns, but the optimum size appears to be 10 microns or less. Nylon of this size may be obtained in accordance with the process described in United States application Serial Number 95,587, now U. S. Patent 2,592,616, filed in the names of Louis L. Stott and Laurence R. B. Hervey on May 26, 1949, and United States application Serial Number 273,566, now U. S. Patent 2,742,440, filed in the names of Louis L. Stott and Laurence R. B. Hervey on February 26, 1952, and United States application Serial Number 202,405, now U. S. Patent 2,639,278, filed in the names of Louis L. Stott and Laurence R. B. Hervey on December 22, 1950. These methods disclose that nylon may be dissolved in mixtures of lower alcohols and water, and methanol alone under pressure and at elevated temperatures, and that nylon may be dissolved in polyhydric alcohols merely by heating them together. Oxygen is excluded during the heating step. Upon cooling, the nylon precipitates as a fine powder which, when washed and dried, is suitable for the present process. In the case of polyhydric alcohols solution cooling may conveniently be accomplished by adding water to the hot nylon solution. If waste nylon is employed, undissolved material is preferably removed when the polymer is in solution.

It has been found preferable to use nylon which has been prepared in this manner. This may be because of the difficulty in obtaining material having an average ultimate particle size of less than 40 microns as is obtained by the process described. It is also to be recognized that the product obtained by precipitating nylon as described in the above-identified applications is crystalline in character and becomes more so upon sintering as disclosed by X-ray diffraction patterns. But for whatever the reason, the nylon must be reduced in size to the order of less than 40 microns in diameter.

I have found that contrary to established procedures for handling thermoplastic materials it is possible to cold press the polyamide-molybdenum disulfide mixture, remove the article from the mold and subsequently sinter finely divided polyamide materials into finished articles, provided the starting particle sizes are of the order indicated. No precautions need be observed with respect to the type of metals coming in contact with the nylon.

I have found that molybdenum disulfide used as a filler results in a molded nylon article having excellent self-lubricating properties. Molybdenum disulfide may be added in amounts up to 90% by weight of the nylon-filler mixture and amounts as low as 1% are effective.

The use of molybdenum disulfide as a filler not only gives the final molded article self-lubricating properties, but also imparts added strength to the article, gives a higher heat distortion point, serves to reduce hygroscopic or thermal expansion, as compared to articles made entirely of nylon, and at the same time aids materially in securing dimensional accuracy through reduced distortion during sintering. By giving the molded article self-lubricating properties, the molybdenum disulfide materially reduces the sliding friction between a surface of a molded article and another harder surface. This improvement in sliding friction is especially noted in contact with aluminum. Especially excellent frictional properties in contact with aluminum have been noted with compositions of 10% molybdenum disulfide with polyhexamethylene adipamide powder.

The molybdenum disulfide should preferably be in a finely divided state to achieve better distribution throughout the finely divided polyamide and hence, better final bonding of the shaped article.

To incorporate the molybdenum disulfide, it is well mixed with the nylon. The mixing may be accomplished either by incorporating the molybdenum disulfide powder into the solution of nylon, as described above, and precipitating it with the nylon, or it may be incorporated with the precipitated but undried nylon or with dried out rewetted nylon. If small amounts in the order of 3 percent or less of molybdenum disulfide are to be added, it may be incorporated by mixing dry powders together. Where maximum strength is desired wet mixing is preferred when larger amounts of molybdenum disulfide are employed. In any case a unique and useful mixture is obtained which may be subsequently molded or used for other purposes. To mold the powder mixture, it is briquetted by the use of sufficient pressure to cause the resultant shaped article to withstand moderate shocks incident to its handling. The pressures employed range generally between about 10 tons per square inch and 50 tons per square inch. The pressures do not seem to be critical, but it has been found that about 25 tons per square inch is a very satisfactory pressure. Pressure in the order of 3 tons per square inch yields a briquette which may be handled only with considerable care and when fired has a compressive strength of about one-half that of a similar piece pressed at 25 tons per square inch. Pressures in excess of 75 tons per square inch are not required. The resultant "cold" preformed article is then sintered by heating it under non-oxidizing conditions to a temperature below the melting point of the nylon present for a time sufficient to cause the article to be strong and hard when cooled. In accordance with application Serial No. 272,966, filed February 23, 1952, in the name of Louis L. Stott, I have found that if several pieces are molded from nylon powder at room temperature and sintered at various temperatures ranging from slightly above room temperature up to nearly the melting point and the resultant pieces are tested for compression strength, that an interesting phenomenon becomes apparent. Referring now to the drawing, the curves are plots of the loads required to break bearings 1 inch long, ½ inch I. D. and ¾ inch O. D. when the loads are applied along the surface perpendicular to the axis. Curve A is a plot of epsilon-caprolactam polymer sintered at various temperatures; curve B is a plot of the loads required to break similar bearings of polyhexamethylene sebacamide sintered at various temperatures, and curve C is a plot of the loads required to break similar bearings of polyhexamethylene adipamide at various temperatures. The bearings were sintered in vacuo.

It will be noted that in the accompanying drawing, the log of the compressive load is plotted against the reciprocal of the temperature in degrees absolute (degrees centigrade $+273°$). Since two substantially straight lines result from plotting increasing sintering temperatures for each material, it is apparent that below the inflection point on any curve a single process is operative which is a function solely of an activation energy and the temperature. Above the inflection point a new process is operative with a different activation. It is this second process which forms part of this invention which is concerned since sintering below the inflection point is ineffective. This inflection point is displayed not only for pure polyamides but also for mixtures containing molybdenum disulfide.

It is not known why the strength suddenly begins to increase at a rapid rate, but the inflection point may be easily determined for any given polyamide. Reference will be made hereafter to the break in the curve at the inflection point. The temperature to which the polyamide should be heated is therefore above the inflection point and below the point where any substantial molten phase occurs. If any substantial amount of molten phase occurs, the article warps, blisters and becomes unusable. As may be observed, the temperature to which the molybdenum disulfide mixtures containing polyhexamethylene adipamide should be sintered is from about 200° C. to about 263° C., those containing polyhexamethylene sebacamide should be sintered from about 190° C. to about 220° C., and those containing the polymer of epsilon-caprolactam from about 160° C. to about 215° C.

Before molding the powder mixture it may be granulated, if desired, to obtain freer flowing powder. Molding is advantageously accomplished by placing the granulated powder mixture in a mold or otherwise compressing it as by passing it through pressure rollers.

After forming, the cold preformed nylon molybdenum disulfide article is then sintered by heating it under non-oxidizing conditions. The time range is usually between 2 to 30 minutes.

The presence of moisture in the nylon powder can, under some conditions, cause cracks to appear in the article on sintering. This is particularly true when the sintering is done in hot oil as contrasted with sintering in vacuo. It has been found that relatively small bearings containing 3 percent moisture or more before sintering, will crack if immersed directly in hot oil. On the other hand, a similar bearing first immersed in cold oil and then the oil raised slowly to the sintering temperature will be free from cracks. It is therefore preferred to keep the moisture content of the formed nylon article before sintering as low as possible, preferably below about 1 percent moisture. In the case of large solid objects, the presence of moisture is more critical and a vacuum drying step either on the powder or the preformed article is desirable.

In the above discussion the pressing has been assumed to take place at about room temperature. If the temperature of the mold is raised to a point close to the melting point of the nylon, very unsatisfactory material is produced. A somewhat elevated temperature may be tolerated, however, and such temperature appears to add some strength to the "green" article, but does not materially affect the finished product when sintered. It is essential therefore that the pressing be accomplished at a temperature below that at which any molten phase can occur and preferably at or about room temperature.

The reason for the extremely tight bond obtained by my process is not apparent. It may be that the high pressure employed followed by sintering causes sufficient reorientation analogous to crystal growth to secure adequate bonding. But whatever the reason may be it is totally unexpected that a strong bond would form and it is unexpected that any amounts of molybdenum sulfide up to 85% of the total bulk volume yield articles of surprising strength.

A further unexpected advantage is secured by my technique in that powder obtained from waste textile nylon such as stocking material may be successfully used either alone or in connection with powder obtained from virgin nylon. All attempts to melt and mold or extrude waste nylon have resulted heretofore in excessively brittle products not suitable for commercial use. It is apparent therefore that the high cost factors restricting the wider use of molding nylon shapes have been largely overcome by the process described herein. The special and expensive tools required by the present techniques are replaced by the relatively simple and available cold pressing equipment used in the powder metallurgy art and the relatively expensive virgin nylon may be substituted in whole, or in part, by nylon obtained from nylon scrap and textile waste, such as textile clippings and stockings.

If close tolerances are not required, the pressed, sintered articles may be satisfactorily used without subsequent conditioning or annealing to remove strains which may occur to a minor extent in the molded articles. In some bearings and other articles, the necessity for close tolerances requires that the article be free from slight additional shrinkages in service. Annealing is accomplished by simply heating the article, preferably under non-oxidizing conditions, to a temperature under but preferably close, i. e., within 50° C. to the melting point of the polyamide for a few minutes to an hour and slowly cooling. Holding for longer times at lower temperatures also reduces strains. In some cases annealing may be combined with the sintering step to avoid two furnace treatments.

One of the important uses for molded nylon containing molybdenum disulfide has proved to be in the field of bushings and bearings. Polyhexamethylene adipamide and molybdenum disulfide in particular, have exhibited considerable merit for bushings operating at light loads, especially where normal lubrication is difficult. In many instances these bushings have shown superior wear resistance to similar pieces made from powdered bronze. The bearings made in accordance with this process are fully equal to any nylon bushings made from nylon by and of the present standard techniques and have the advantages of being free from any gross amount of strain and of having higher heat resistance than articles formed from nylon alone. Tests have indicated that the tendency to seize is less than that of injection molded bearings and therefore they may be made to closer tolerances. Other articles which may be advantageously prepared by the process of this invention include various small irregular shapes employed where the wear resistance and strength are important factors. Such articles include but are not limited to small gear parts, bushings, etc., and articles which are subjected to a great amount of friction.

As many apparently widely different embodiments of this invention may be made without departing from the spirit and scope thereof, it is to be understood that I do not limit myself to the specific embodiments thereof, as illustrated by the following examples, except as defined in the appended claims.

*Example I*

Ninety grams of cleaned waste polyhexamethylene adipamide was dissolved in 500 ccs. of ethylene glycol in a nitrogen atmosphere at 187° C. To this solution was added 10 grams of molybdenum disulfide. On cooling the polyhexamethylene adipamide and molybdenum disulfide precipitated quantitatively from the ethylene glycol as particles having a diameter of about one-half micron and a length of about 20 microns. The precipitate was washed with water to remove the residual ethylene glycol, and vacuum dried at room temperature. The result was a finely divided powder in which the molybdenum disulfide and polyhexamethylene adipamide particles were evenly distributed, despite the large density differences between the two components.

*Example II*

A portion of the powdered mixture made in Example I was pressed at room temperature at a pressure of 25 tons per square inch to give test bushings with an inside diameter of about 0.5", outside diameter of 0.75" and 0.75" long. The bushings were removed in a green condition and one was heated in a vacuum to 263° C. while another was placed in a bath of Meprolene (a temperature-resistant hydrocarbon oil) heated to 263° C. After the bushings were heated throughout, they were removed and cooled. Wear tests of these bushings indicated that the self-lubricating properties imparted to them by the molybdenum sulfide made them markedly more resistant to wear. Compression strengths of these bushings were determined by applying loads perpendicular to the axes of the bushings. Loads of 60, 210, and 195 pounds for the green bushing and for the bushings sintered in vacuum and in Meprolene, respectively were measured.

*Example III*

One hundred grams of polyhexamethylene adipamide was precipitated in finely divided form from hot ethylene glycol, as described in Example I, and permitted to remain in the cooled ethylene glycol. To this dispersion was added 150 grams of finely powdered molybdenum disulfide and the mixture was washed with water to remove the residual ethylene glycol. The powder was dried to give a uniform mixture of polyhexamethylene adipamide and molybdenum disulfide which did not segregate.

*Example IV*

A portion of the powdered mixture made in Example III was made into bushings of the same dimensions and in the same manner as described in Example II. The bushings showed good breaking strengths, being 65, 115, and 150 pounds respectively. The test bushings which had been sintered were placed in a test apparatus in which weighted rods were inserted and revolved for about 32 hours. The increase in internal diameter was used as a measure of wear resistance. The bushings made by this process showed an increase of 0.0003 to 0.0011 inch compared to about 0.0027 for a comparable graphite bushing. In addition, the polyhexamethylene adipamide-molybdenum disulfide bushing had a coefficient of friction of 0.21 as compared to 0.29 for the graphite bushing.

*Example V*

A block molded from the powder made in accordance with Example I sintered at 263° C. in hot Meprolene was tested for wear resistance against aluminum. When operated in sliding contact with an aluminum surface under load of 80 pounds per square inch at 20 feet per minute for about six miles there was no apparent wear either on the sintered nylon or the aluminum. Regular molded nylon, unfilled sintered nylon, graphite-filled sintered nylon, polytetrafluoroethylene, molded phenolic resin and various metals all showed higher friction, or a greater degree of wear.

*Example VI*

Ninety grams of cleaned waste polyepsilon caprolactam was dissolved in 500 ccs. of ethylene glycol in a nitrogen atmosphere at 187° C. To the resulting solution was added 10 grams of molybdenum disulfide. After mixing, the solution was allowed to cool to 170° C., and water was added to quench. The polymer and the molybdenum disulfide precipitated quantitatively, as particles having a diameter of about one-half micron and a length of about 20 microns. The precipitate was washed with water to remove the residual ethylene glycol, and vacuum dried at room temperature. There resulted a finely divided powder in which the polymer and filler particles were evenly distributed, despite the large density differences.

*Example VII*

A portion of the powdered mixture prepared in accordance with Example VI was pressed into bushings and heated, all as described in Example II except that the heating temperature was 213° C. Wear tests on these bushings showed the same good properties as those of the bushings made by the procedure of Example II.

*Example VIII*

The procedure of Example VI was followed exactly, but using polyhexamethylene sebacamide instead of polyepsilon caprolactam, and cooling the solution to 156° C. instead of 170° C. before adding water to quench. There resulted a finely divided powder in which the molybdenum disulfide and polyhexamethylene sebacamide particles, of the degree of fineness set forth in Example VI, were evenly distributed, despite the large density differences.

*Example IX*

The same procedure as described in Example VII was carried out on a portion of the powdered mixture prepared in accordance with Example VIII. Wear tests on the resulting bushings showed the same good properties as those of the bushings made in accordance with Examples II and VII.

It is readily apparent that as a result of my invention, many different nylon-molybdenum disulfide articles have wide industrial use because of the strength, dimensional stability, temperature resistance, and self-lubricating qualities of these articles.

Having now described my invention, I claim:

1. A composition comprising a mixture of finely divided linear polyamide and molybdenum disulfide, said linear polyamide being a polyamide which is soluble in phenol at room temperature and insoluble in ethylene glycol except at temperatures above about 140° C. and having an ultimate particle size of less than 40 microns, said molybdenum disulfide being present in a concentration of from about 10 to about 90 percent by weight.

2. The composition in accordance with claim 1 wherein the polyamide is polyhexamethylene adipamide.

3. The composition in accordance with claim 1 wherein the polyamide is polyhexamethylene sebacamide.

4. The composition in accordance with claim 1 wherein the polyamide is the polymer of epsilon caprolactam.

5. A composition comprising a mixture of finely divided linear polyamide and molybdenum disulfide, said linear polyamide being a polyamide which is soluble in phenol at room temperature and insoluble in ethylene glycol except at temperatures above about 140° C., said mixture having been formed by adding said molybdenum disulfide to a solution of said polyamide in the ethylene glycol, cooling to co-precipitate the resulting mixture of polyamide and molybdenum disulfide, and washing and drying said co-precipitated mixture, said molybdenum disulfide being present in a concentration of from about 10 to about 90 percent by ewight.

6. A shaped polyamide article comprising sintered synthetic linear polyamide particles and molybdenum disulfide, said polyamide being one which is soluble in phenol at room temperature and insoluble in ethylene glycol except at temperatures above about 140° C. and having an average ultimate particle size of less than 40 microns, said molybdenum disulfide constituting from about 10 to about 90 percent by weight of said article, said article being characterized by being bonded by sintering action alone and having self-lubricating properties.

References Cited in the file of this patent

UNITED STATES PATENTS

| | | |
|---|---|---|
| 2,345,533 | Graves | Mar. 28, 1944 |
| 2,592,616 | Stott et al. | Apr. 15, 1952 |
| 2,639,278 | Stott et al. | May 19, 1953 |
| 2,695,425 | Stott | Nov. 30, 1954 |
| 2,698,966 | Stott et al. | Jan. 11, 1955 |
| 2,748,099 | Bruner et al. | May 29, 1956 |